United States Patent
Hussain et al.

(10) Patent No.: US 8,590,034 B2
(45) Date of Patent: Nov. 19, 2013

(54) METHOD, SYSTEM AND APPARATUS FOR PROVIDING STATEFUL INFORMATION REDACTION

(76) Inventors: Basit Hussain, Odessa, FL (US); Saeed Rajput, Boca Raton, FL (US)

( * ) Notice: Subject to any disclaimer, the term of this patent is extended or adjusted under 35 U.S.C. 154(b) by 50 days.

(21) Appl. No.: 12/563,681

(22) Filed: Sep. 21, 2009

(65) Prior Publication Data

US 2010/0241844 A1   Sep. 23, 2010

Related U.S. Application Data

(63) Continuation of application No. 11/425,524, filed on Jun. 21, 2006, now abandoned.

(51) Int. Cl.
*H04L 29/06* (2006.01)
*G06F 21/00* (2013.01)

(52) U.S. Cl.
USPC ........ 726/13; 726/1; 726/11; 726/12; 726/14; 726/26; 726/27; 726/28; 726/29; 726/30; 713/151; 713/153; 713/154; 713/164; 713/165; 713/166; 713/167; 713/182; 707/781; 707/783; 707/784; 707/785; 707/786; 707/787; 707/788; 707/754; 707/755; 707/756; 707/757; 709/217; 709/219; 709/225; 709/226; 709/229

(58) Field of Classification Search
USPC .............. 726/26–30, 1, 11–15; 713/150–154; 713/164–167, 182–186; 707/781–788; 707/754–757; 709/223–229
See application file for complete search history.

(56) References Cited

U.S. PATENT DOCUMENTS

| 6,889,205 | B1 * | 5/2005 | Lamm ............................. 705/40 |
| 7,774,485 | B2 * | 8/2010 | Patrick et al. ................. 709/229 |
| 2004/0015729 | A1 | 1/2004 | Elms et al. |
| 2006/0075228 | A1 * | 4/2006 | Black et al. ................... 713/167 |
| 2006/0184549 | A1 * | 8/2006 | Rowney et al. ............... 707/100 |
| 2006/0248350 | A1 * | 11/2006 | Stanev ........................... 713/189 |
| 2006/0259954 | A1 * | 11/2006 | Patrick ............................ 726/2 |
| 2006/0277220 | A1 * | 12/2006 | Patrick et al. ................. 707/200 |
| 2007/0094594 | A1 * | 4/2007 | Matichuk et al. ............. 715/530 |

OTHER PUBLICATIONS

Handbook of Applied Cryptography by Menezes et al; Year: 1997; Publisher: CRC Press LLC.*
ASP Session Object by W3Schools; Year: 2004; Publisher: W3Schools.*
Relational Databases by Awtrey et al; Date: May 13, 2005; Publisher: Anthony L. Awtrey.*
Preserving Privacy in Web Services by Rezgui et al; Publisher: ACM; Date: Nov. 8, 2002.*
PatientService: Electronic Patient Record Redaction and Delivery in Pervasive Environments by Choudhri et al; Publisher: IEEE; Year: 2003.*

* cited by examiner

Primary Examiner — Madhuri Herzog (57) ABSTRACT

A system (101) for implementing redaction rules in compliance with an organization's privacy policy, where the system intercepts messages between an information source (103) and an information destination (102), modifies the message contents based on redaction rules (106) and forwards the redacted contents over to the client. The system also maintains a record of the redacted information and updates the contents of any message submitted by the client (102) in order to maintain database integrity.

11 Claims, 6 Drawing Sheets

Redaction Process Flow

Fig 1: Stateful Redaction flow

Fig 2: Multi-protocol Redaction using Multiple Redaction Appliances

Fig 3: Redaction Process Flow

Fig 4: Information Representation at Different Process Points

```
MSH|^~\&|GREAT LAB|LAB-4|GREAT INC|MEDICAL ARTS BLDG|200705151145||ORU^R01|C-431234|
P|2.4<cr>
PID|||999-99-9999||JANE^DOE^E|SMITH|19600101|F|||250 ANYSTEET AVE.^
 ^DAVIE^FL^33314||(954)999-9999|(954)899-9999||||AC999||68-A4445^FL^20080601<cr>
OBR|1|0123456^GREAT INC|6543210^GREAT LAB|15545^GLUCOSE|||200706130930||||||||
 999^99^9999^PRIMARY^POWERS^^^^MD^^|||||||||F||||||444-44-4444^JONES^HOWARD
H^^^^MD<cr>
OBX|1|SN|1554-5^GLUCOSE^POST 12H CFST:MCNC:PT:SER/PLAS:QN||^172|mg/dl|70_105|H|||
F<cr>
```

Message Contents at the input of the redaction appliance

```
MSH|^~\&|GREAT LAB|LAB-4|GREAT INC|MEDICAL ARTS BLDG|200705151145||ORU^R01|C-431234|
P|2.4<cr>
PID|||999-99-9999||JANE^DOE^E|SMITH|19600101|F|||250 ANYSTEET AVE.^
 ^DAVIE^FL^33314||(954)999-9999|(954)899-9999||||AC999||68-A4445^FL^20080601<cr>
OBR|1|0123456^GREAT INC|6543210^GREAT LAB|15545^GLUCOSE|||200706130930||||||||
 XXX^XX^9999^PRIMARY^POWERS^^^^MD^^|||||||||F||||||444-44-4444^JONES^HOWARD
H^^^^MD<cr>
OBX|1|SN|1554-5^GLUCOSE^POST 12H CFST:MCNC:PT:SER/PLAS:QN||^XXX|mg/dl|70_105|H|||
F<cr>
```

Message Contents at the output of the redaction appliance

Fig 5: Contents of an HL7 Message before and after the redaction appliance

```
<HTML><HEAD>HTTP Headers</HEAD>
<BODY>
    <observationEvent>
        <id root="2.16.840.1.113883.19.1122.4" extension="1045813"
            assigningAuthorityName="GREAT LAB Filler Orders"/>
        <subject name=John Doe" SSN="234 44 1234"
            DOB="October 1, 1955"/>
        <statusCode code="completed"/>
        <priorityCode code="R"/>
        <confidentialityCode code="N"/>
        <value xsi:type="PQ" value="182" unit="mg/dL"/>
        <interpretationCode code="H"/>
        <referenceRange>
            <interpretationRange>
                <low value="70" unit="mg/dL"/>
                <high value="105" unit="mg/dL"/>
            </value>
            </interpretationRange>
        </referenceRange>
    </observationEvent>
</BODY>
</HTML>
```

Message Contents at the input of the redaction appliance

```
<HTML><HEAD>HTTP Headers</HEAD>
<BODY>
    <observationEvent>
        <id root="2.16.840.1.113883.19.1122.4" extension="1045813"
            assigningAuthorityName="GREAT LAB Filler Orders"/>
        <subject name=John Doe" SSN="XXX XX 1234"
            DOB="October 1, 1955"/>
        <statusCode code="completed"/>
        <priorityCode code="R"/>
        <confidentialityCode code="N"/>
        <value xsi:type="PQ" value="XXX" unit="mg/dL"/>
        <interpretationCode code="H"/>
        <referenceRange>
            <interpretationRange>
                <low value="70" unit="mg/dL"/>
                <high value="105" unit="mg/dL"/>
            </value>
            </interpretationRange>
        </referenceRange>
    </observationEvent>
</BODY>
</HTML>
```

Message Contents at the output of the redaction appliance

Fig 6: Contents of an HTTP Message before and after the redaction appliance

METHOD, SYSTEM AND APPARATUS FOR PROVIDING STATEFUL INFORMATION REDACTION

CROSS-REFERENCE TO RELATED APPLICATIONS

This application claims priority to U.S. Non-Provisional application Ser. No. 11/425,524 entitled "Method and System for Providing Granular Data Access Control for Server-Client Applications," filed by the same first named inventor on Jun. 21, 2006.

BACKGROUND OF THE INVENTION

Securing access to enterprise resources is a balancing act between usability and control. It requires vigilance, persistence, care, and effort. The process starts with risk and vulnerability assessment of the enterprise's assets followed by the security policy definition. When business needs require dispensing data to the Internet and sharing information with partner networks, a unique set of security challenges that cannot be solved by the traditional solutions of firewalls and virtual private networks is presented. In addition to other characteristics, enterprise security policies determine what resources must be available, to whom, and under what circumstances. A related concern deals with the privacy matters, where more information might be dispensed by the computer systems than necessary. In some cases, there may not be sufficient control over such data, which might be supplied by third party providers. In other cases, it becomes costly to alter the systems without significant time and money.

A typical scenario would be a call center setting. The call center employees view and process data provided by third party institutions that include health care and financial institutions. In most cases, the data includes very sensitive information such as social security numbers and credit card numbers. The call center employees do not need such information for the purpose of performing their daily duties. However, having such information available makes it susceptible to theft and can lead to identity fraud.

It is desirable to have control over such data, where the information could be dispensed on an as-needed basis. Ideally, it needs to be controlled based on the role of the user, as well as the source of the data. Such a policy is referred to as "redaction rule" in the context of this document and the process of removing such information is referred to as information redaction. Enforcement of these redaction rules is extremely desirable but no easy implementation exists without a massive investment in resources that ends up altering the original system.

In order for such a system to be effective, the information redaction must take place as close to the information source as possible. Some prior art systems try to perform redaction close to the destination. While such a solution would work for ordinary users, they do not protect from the savvy identity thieves. In Patent Application Publication Number US 2004/0015729 A1 by Elms et al, published Jan. 22, 2004, the system relies on detecting a client's presence and redacting information from the display. In this scenario, the information has already made its way to the computer system and is simply being obscured from the viewer. A packet sniffer or a Trojan horse running on the system will easily compile and reveal this information. As an option, Elms et al provide a mediator that is configured through a browser. The mediator provides the advantage of redacting information before it makes it to the computer but it can easily be bypassed by anyone with the knowledge of configuring a proxy. Such an action would result in full display of the information. Finally, the cited solution is limited to systems that only display information through a browser and is not applicable to either machine-to-machine information exchange such as the case with legacy electronic data exchange (EDI) and modern web services where machines exchange information using legacy or modern protocols or to terminal emulation programs and thick client desktop applications.

It is desirable to have a cost effective, easily configurable system that enables granular redaction control over multiple applications. Prior art access controls do not provide sufficient granularity and also do not work across multiple application protocols. Accordingly, a new data access control methodology and system is needed that must (a) provide information redaction based on a client's role and application being accessed (b) redact information in transit close to the origination source without requiring application alteration and (c) work across multiple application protocols.

BRIEF DESCRIPTION OF THE DRAWINGS

FIG. 6 shows the contents of an HTTP protocol based message before and after the redaction appliance.

SUMMARY OF THE INVENTION

A system that is capable of intercepting, parsing, and reconfiguring networked application messages as they flow between an information source and destination. The former is an application serving data and latter is a client machine, process, appliance, software system or another application. The system is a network appliance, based on embedded technology, with multiple physical interfaces. It contains technology for interfacing with a separate redaction rules engine and a client role identification service. The system identifies the client associated with a network message, obtains the redaction rules that would apply to such a message, parses the data to detect if it contains any information that violates the redaction rules, and replaces such information with benign contents while maintaining the integrity of the message.

In an alternative embodiment of the invention, in addition to above, the redacted contents are also maintained within the redaction appliance. If the client tries to update the original information with modifications, the redacted contents are replaced within the message to maintain the integrity of the data within the application server database.

DETAILED DESCRIPTION OF THE PREFERRED EMBODIMENT

The invention explained herein is called a redaction appliance. The preferred embodiment comprises an embedded computer based on a standard operating system such as Linux. The kernel is compiled with bare minimum options in order to harden it and minimize any attacks against it. The operating system is also assembled from scratch in order to provide the highest performance with a minimal amount of services running on it. The appliance has a minimum of two logical network connections, which in specific embodiments can also be implemented as physical connections, where one of the connections services the clients or end users and the others connect to the applications. The appliance is placed as close to the information source as possible. It runs specialized processes that are capable of intercepting the communications to and from the information source, parsing it and detecting any information that could be deemed as sensitive by government regulations or by the company's own privacy policies. Such sensitive information is seamlessly replaced with masked information that does not violate the privacy policies, yet maintains the integrity of the message and the protocol carrying the message. The masking of such information can be performed in a uniform manner for all the recipients, but the preferred embodiment associates the client with the request and performs the masking based on the client's role within the organization.

Figure 1:
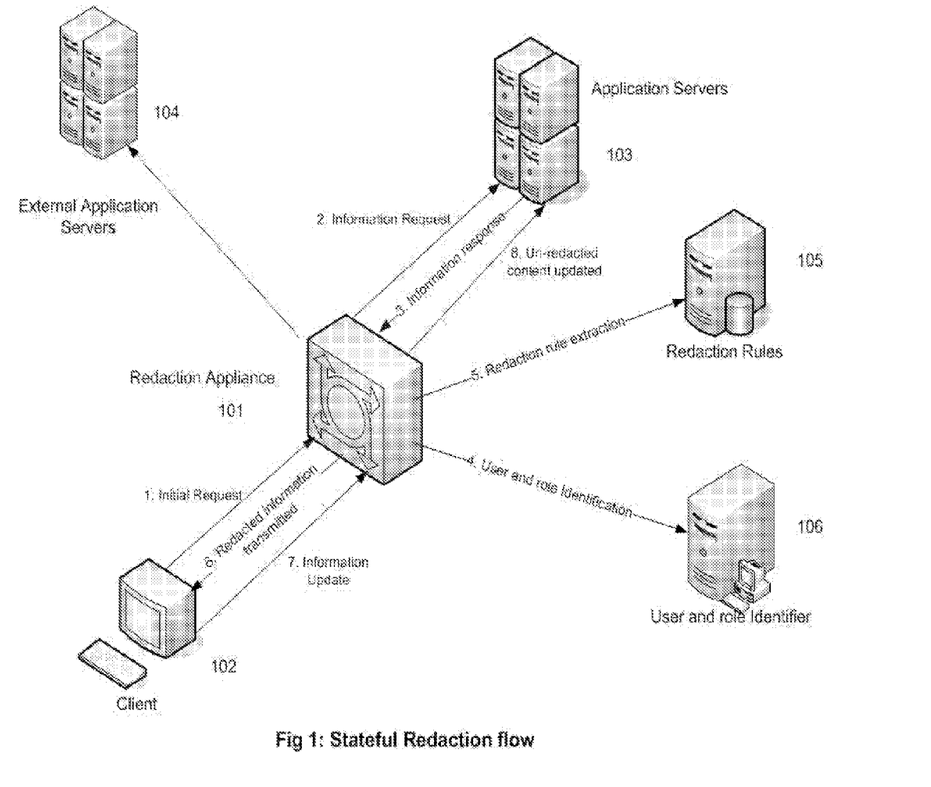
FIG. 1 shows the deployment of the redaction appliance within a network and the redaction process flow.

FIG. 1 shows the deployment of the redaction appliance in a simplified setting. The appliance (101) is deployed within the network where it intercepts traffic from the internal application servers (103) as well as external application servers (104), as it flows towards the client machine (102). The distinction between the two types of application servers is important with regards to the appliance's benefits, even though the process of redaction is not affected. In case of internal application servers, the deploying organization may have control over the application and could utilize redaction through alternate means, such as application reconfiguration or writing new source code. In case of external application servers, the data is served by external content or application providers, which allows no control to the deployment organization, thus immensely increasing their liability in the absence of this invention. The redaction appliance interacts with two external databases in order to perform its functions. The first is a redaction rules engine (105) and the second is a user and role identifier database (106). The user and role identifier database belongs to the deploying organization and minimally contains user names, their authentication credentials and their roles within the organization. The database can reside within an LDAP or SQL server, although other options are also possible. The redaction rules are defined for the appliance usage by a system administrator and reside within an LDAP server. Only one such database needs to be defined even if multiple applications and redaction appliances are involved.

FIG. 1 also shows the flow of the redaction process. The process starts with the user issuing a request for information. Such a request is directed at the application server. It is intercepted by the redaction appliance and the complete request is assembled. The request is forwarded to the server and a response obtained as a result of this request. While FIG. 1 shows interaction with the internal application servers (103), the case is identical for communicating with external application servers (104). The appliance configuration options define the manner of redirection of the request. The appliance associates the request and response with the specific client by examining the client identification information. In one scenario, such identification information will be contained within an authentication request that could be directed at the same application server or a centralized authentication server. In an alternate scenario, the authentication information would be contained within the request for information. Once the authentication process succeeds, the redaction appliance uses the said identification information to obtain the client role(s) from the role database (106). The corresponding redaction rules for this role are retrieved from the rules database (105) and stored within the appliance for the remainder of the session. The appliance applies the redaction rules and masks out part of the information. This information is not conveyed to the client and hence not displayed at the information destination.

In an alternate embodiment, that is more suitable for database applications where the client requests a single or plurality of records, the redaction appliance not only redacts the information but also keeps track of the original state of the records returned by the server by associating them with the client session before returning them to the client. More specifically, the redacted information is maintained by the redaction appliance. As is usually the case with database applications, the client may subsequently modify the single or plurality of records it has received and submit all or subset of those to the server within a subsequent request for update. The redacted information is re-inserted within that request by the said redaction appliance before the request is forwarded to the server, so that the database integrity is not compromised by partially redacted records.

Figure 2:
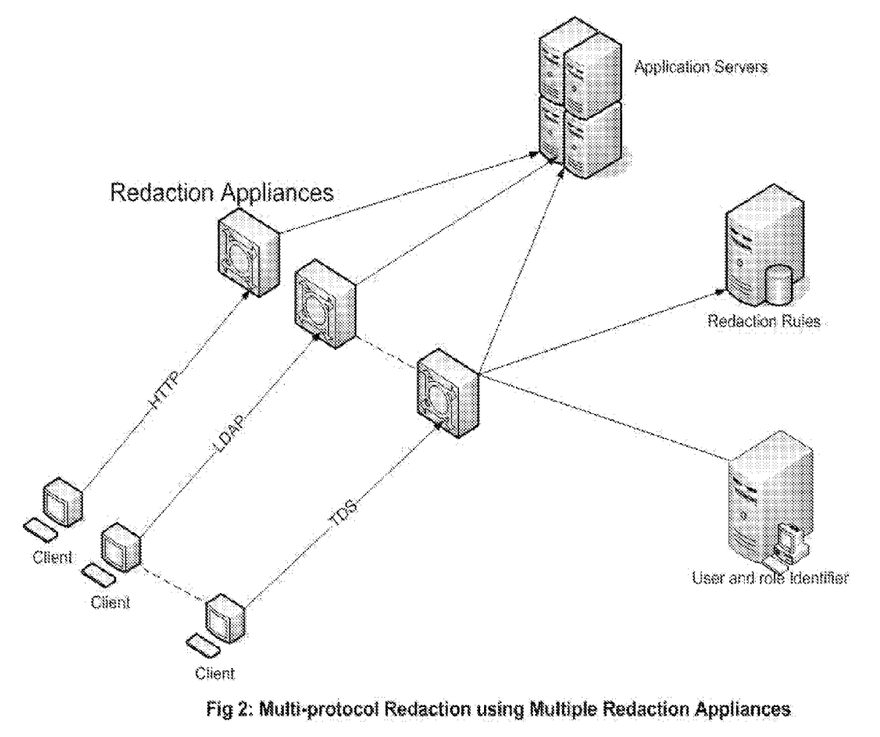
FIG. 2 extends the representation of FIG. 1 to show the handling of multiple protocols.

FIG. 2 shows a more typical deployment of the simplistic case depicted in FIG. 1. The redaction appliances detect, parse and process information at the application protocol level. In the preferred embodiment, each appliance focuses on one application protocol in order to keep the network high performance and not experience any perceptible delays. In an alternate embodiment, a single appliance can handle multiple application protocols. Some of the network protocols that the appliances work with include HTTP, LDAP, 3270/5250 over Telnet and TDS, although the system architecture supports all application protocols by deploying the appropriate protocol parser. FIG. 2 shows the use of one redaction appliance per protocol. Even though multiple appliances are deployed, they all use the same user database and redaction rules database.

Figure 3:
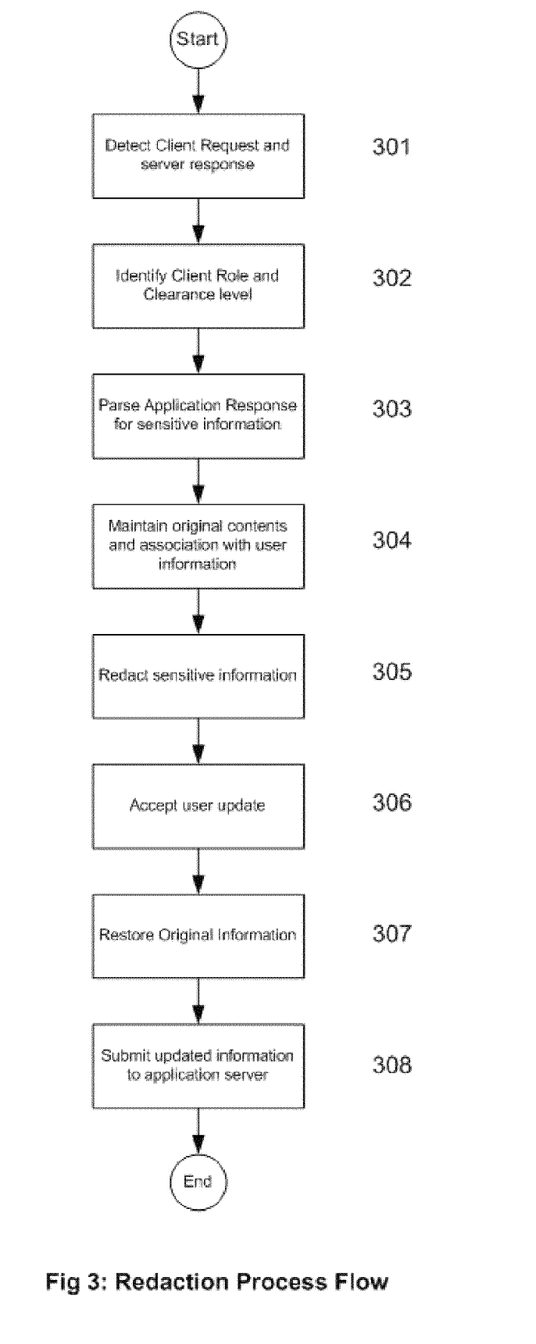
FIG. 3 explains the redaction process as information travels across the network.

FIG. 3 provides a step-by-step flow of the redaction process that has been partially discussed above during the description of FIG. 1. The redaction process starts when the redaction appliance detects a client request and the corresponding server response (301). The appliance identifies the client making the request using the authentication information embedded within the request. Once the client has been identified, the client's role is retrieved from the role database (106). The redaction rules associated with this role are retrieved from the redaction rules database (105) and associated with this client's session. This process is carried out only once during a single client session. All subsequent server responses directed to this client are subjected to the redaction rules applicable to his or her roles (302). These responses are parsed by the protocol parser for the application protocol in use for that session (303). As an example, the protocol can be HTTP or 3270 terminal emulation over telnet. Parsing the message stream allows the redaction appliance to determine if any of the redaction rules need to be enforced. On making such a determination, the appliance makes a temporary copy of the sensitive information (304) and replaces it with a predetermined character, such as Xs or blanks (305). The client does not get to see the redacted information, yet proceeds with his required duties, such as information updates. Once the client submits an update, the appliance intercepts the updated message (306) and restores the redacted contents at the appropriate place(s) within the message (307). The resulting message is submitted to the server in order to complete the process (308). It is important to note that the redaction rules will be enforced differently for different clients if they carry different organizational roles. A specific client may see three information items redacted, while another one may see only one such item redacted.

Figure 4:
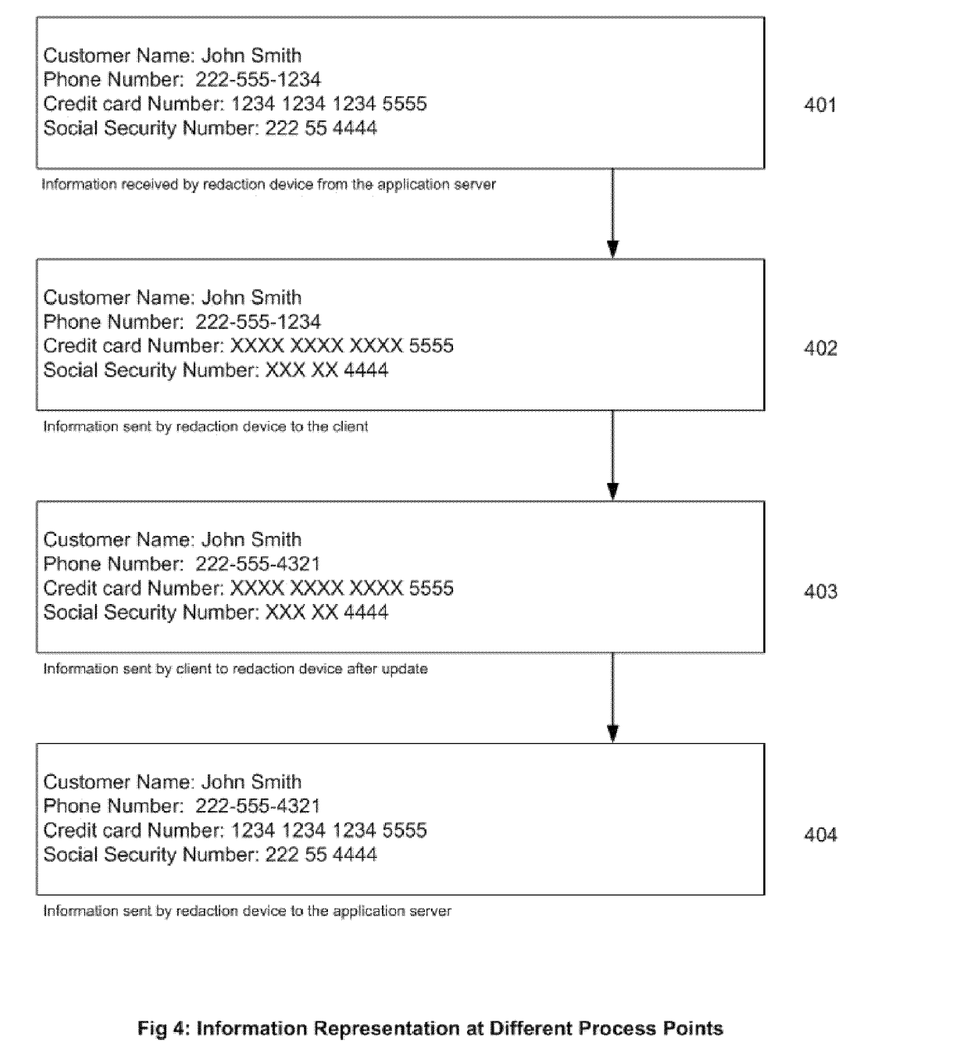
FIG. 4 shows the benefit to the institutions deploying the redaction appliances.

FIG. 4 presents the benefit of this system from the deploying organization's point of view. This is an example of how the background process flow affects a user working on the system. A person has called into a call center to update his phone number. The server sends a message that contains this caller's information, including his social security number and credit card number (401). Upon receiving the server's message, the redaction appliance intercepts it before it makes its way to the call center employee's screen. The redaction appliance applies the redaction rules and masks out all but the last four digits of the social security number and the credit card number (402). The call center employee updates the phone number and submits the information back to the server (403). This message is intercepted by the redaction appliance, which restores the full credit card number and social security number (404) before sending the message back to the server. It should be noted that the redaction appliance works at the message level, where each message is composed of a multitude of network packets. The redaction rules are applied to the message as a whole and not to the individual packets.

Figure 5:
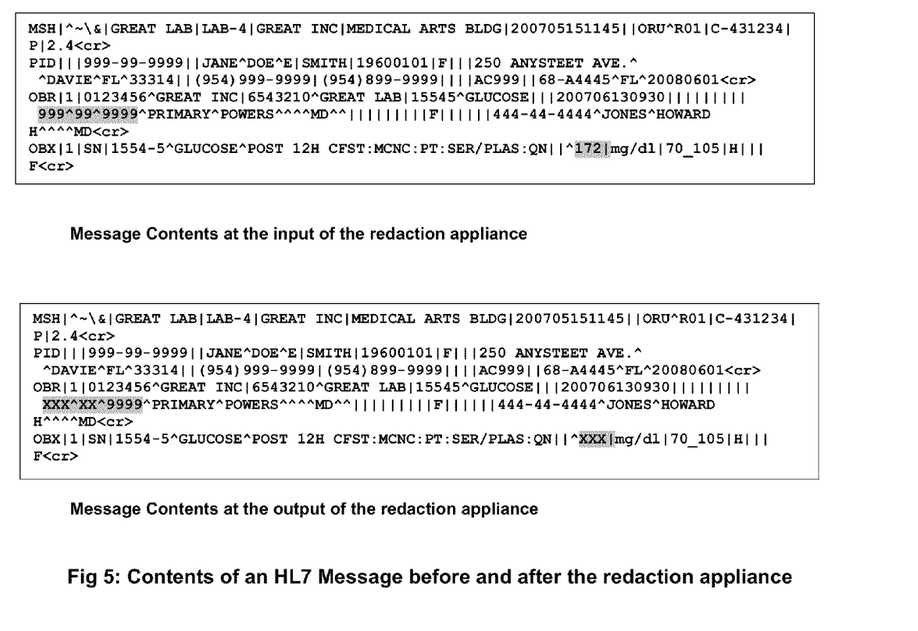
FIG. 5 shows the contents of an HL7 protocol based message before and after the redaction appliance.

FIG. 5 and FIG. 6 provide a behind the scenes look at the message as it travels past the redaction appliance. An identical set of tasks is performed in both of these cases with one major difference—the protocol parser being applied in each case. Two different protocols have been illustrated in order to emphasize that the redaction process works in a protocol independent manner.

FIG. 5 shows a message from a legacy version of the HL7 protocol, that is being used to communicate a patient's medical information. The top section of the figure shows the original message that is received at the redaction appliance (101) from the application server (103). In this case, the redaction appliance is capable of parsing the HL7 protocol and analyzing its contents. The content parser discovers that the message contains the patient's full social security number and test results (highlighted in gray). The privacy policy for this specific viewer's role only allows him to view the last four digits of the social security number and does not allow for the viewing of the test results. The redaction appliance replaces the first five digits of the social security number with the letter X and does the same for the test result values. The resulting message is shown in the bottom portion of FIG. 5 and is forwarded to the viewing client (102).

FIG. 6 shows a different message parser at work, this time for the HTTP protocol. The top portion of the figure shows an HTTP message with HTTP headers followed by an XML document envelop. This message is received by the redaction appliance (101) from an external application server (104). The redaction appliance contains an HTTP protocol parser that locates a patient's social security number and test results within the message. Following the corporate privacy policy, the redaction appliance replaces all but the last four letters of the social security number with the letter X, and does the same for the test result values. This transforms the message into the redacted message shown at the bottom of the FIG. 6. The message is sent over to the client (102) for viewing after that.

The invention claimed is:

1. A method of enhancing information privacy and confidentiality, based on the knowledge of format and syntax of a protocol used for computer communication, wherein a request conforming to the said protocol is received from a client for a database application that accepts the said request from the said client, as well as a response generated as a result of the said request by the said database application, which are intercepted by a redaction appliance that redacts sensitive information, further comprising:
   a. associating the said client with the said request;
   b. requiring the said client to be aware only of a session identifier and not be aware of redaction rules;
   c. working at the message level, where each message is composed of a multitude of network packets;
   d. forwarding the said request to the said database application and intercepting the said response returned by the said database application;
   e. applying redaction rules associated with client's session to a set of records contained within the said response whereby the redaction rules are applied to the message as a whole and not to the individual packets;
   f. redacting information in the said response based on the said redaction rules that results in a modified response that also conforms to the said protocol and contains at least one of the said records that was not fully or partially redacted;
   g. maintaining the redacted information in said redaction appliance;
   h. returning the said modified response to the said client;
   i. waiting for a subsequent request from the said client containing updated versions of one or plurality of the said records that were sent to the said client in the said modified response;
   j. re-inserting the said redacted information that was maintained earlier into the said received subsequent request resulting in a modified subsequent request that now contains completely reconstructed records; and
   k. forwarding the said modified subsequent request to the said database application;
   whereby the integrity of the information is retained without having to modify the said database application or having to expose sensitive information to an unauthorized client.

2. The method of enhancing information privacy and confidentiality of claim 1 wherein the said request received from the said client of the database application is a first such request received that also contains identification information of the said client and further including:
   a. examining client identification information and obtaining a role of the said client from a role database;
   b. retrieving the said redaction rules associated with the said role from a rules database; and
   c. associating the said redaction rules with client's session and storing the said redaction rules within the said redaction appliance for the duration of the session.

3. The method of enhancing information privacy and confidentiality of claim 1 wherein single or plurality of database applications exist and requests sent to and responses received from each of the said database applications are intercepted by the said redaction appliance dedicated to that database application and at least one of the said single or plurality of the database applications is external to an organization that utilizes the said method of enhancing information privacy and confidentiality using the said redaction appliance.

4. The method of enhancing information privacy and confidentiality of claim 1, wherein single or plurality of database applications exist and requests sent to and responses received from a specific database application are intercepted by the said redaction appliance dedicated to that database application and the said response from any of the said database applications is encrypted and the method further includes decryption of the said response by the said redaction appliance before redaction and re-encrypting the said modified response by the said redaction appliance after redaction before returning it to the said client.

5. A redaction appliance for enhancing information privacy and confidentiality, that receives requests from a single or plurality of clients for a single or plurality of database applications, comprising an embedded systems computer including one or a plurality of CPUs, one or a plurality of permanent storage media for storing the said redaction appliance's operating system and redaction rules database, one or a plurality of network interfaces for interacting with the said single or plurality of clients and the said single or plurality of database applications, and a volatile memory area for maintaining distinct sessions and associated redaction rules for each one of the said single or plurality of clients, wherein the redaction appliance is programmed to perform a set of steps comprising:

a. intercepting a request from a client using a protocol used for computer communication, for a database application accepting the said protocol, as well as a response generated by the said database application conforming to the said protocol that is generated as result of the said request, based on the knowledge of format and syntax of the said protocol of the message, and redacting sensitive information
 b. associating the said client with the said request;
 c. requiring the said client to be aware only of a session identifier and not be aware of redaction rules;
 d. working at the message level, where each message is composed of a multitude of network packets;
 e. forwarding the said request to the said database application and intercepting the said response returned by the said database application;
 f. applying redaction rules associated with client's session to a set of records contained within the said response whereby the redaction rules are applied to the message as a whole and not to the individual packets;
 g. redacting information in the said response based on the said redaction rules that results in a modified response that also conforms to the said protocol and contains at least one of the said records that was not fully or partially redacted;
 h. maintaining the redacted information in said redaction appliance;
 i. returning the said modified response to the said client;
 j. waiting for a subsequent request from the said client containing updated versions of one or plurality of the said records that were sent to the said client in the said modified response;
 k. re-inserting the said redacted information that was maintained earlier into the said received subsequent request resulting in a modified subsequent request that now contains completely reconstructed records; and
 l. forwarding the said modified subsequent request to the said database application;
 whereby the said modified responses do not contain any sensitive information that the said client is not authorized to receive.

6. A group of systems including the said redaction appliance of claim 5, including a role database that maintains client roles and a rules database that maintains redaction rules, and the redaction appliance further containing a protocol parser with the capability to extract identifying information of the said client from within first request of the said client, a system to obtain role of the said client from the said role database and retrieve corresponding redaction rules for the said role from the said rules database, associating the said redaction rules with session of the said client and maintaining the said redactions rules within the said redaction appliance for the duration of the said session, wherein initiation of redaction for the said client further comprises:

a. intercepting and examining client identification information in the said first request;
 b. obtaining the said role of the said client from the said role database;
 c. obtaining the said redaction rules from the said rules database for the said role; and
 d. associating the said redaction rules with the said session of the client and storing the said redaction rules within the said redaction appliance for the duration of the session.

7. The redaction appliance of claim 5, wherein the said application is a database application and the redaction appliance further includes the capability to maintain the said redacted information in the said redaction appliance and the said redaction appliance is programmed to perform further steps comprising:

a. applying the said redaction rules associated with the said session to a set of records contained within the said response;
 b. redacting information in the said response resulting in a modified response that also conforms to the said protocol and contains at least one of the said records that was not fully or partially redacted;
 c. maintaining the redacted information in the said redaction appliance;
 d. returning the said modified response to the said client;
 e. waiting for a subsequent request from the said client containing updated versions of one or plurality of the said records that were sent to the said client in the said modified response;
 f. re-inserting the said redacted information that was maintained earlier into the said received subsequent request resulting in a modified subsequent request that now contains completely reconstructed records; and
 forwarding the said modified subsequent request to the said database application; whereby the integrity of information is retained without having to modify the said database application or having to expose sensitive information to an unauthorized client because the said redaction appliance works at the message level.

8. The redaction appliance of claim 5, wherein the said redaction appliance is capable of interacting with the said client that is a user using any user interface including a browser, a telnet terminal, a mobile device, a thick client application and any other software and hardware methods that allows humans to interact with the machines.

9. The redaction appliance of claim 5, wherein the said redaction appliance is capable of interacting with the said client that is a machine or a process, or an automated agent running on a machine.

10. The redaction appliance of claim 5, wherein the said redaction appliance further includes an encryption and decryption subsystem and is programmed to perform additional steps comprising:

a. decrypting the said response before redaction if the said corresponding response from any of the single or plurality of the said database applications is encrypted; and
 b. re-encrypting the said modified response that is generated after redaction before returning it to the said client.

11. The redaction appliance of claim 5, wherein a separate redaction appliance is used for every distinct protocol.

* * * * *